J. W. BENTON.
EDUCATIONAL DEVICE.
APPLICATION FILED NOV. 10, 1919.
1,428,206.                                      Patented Sept. 5, 1922.
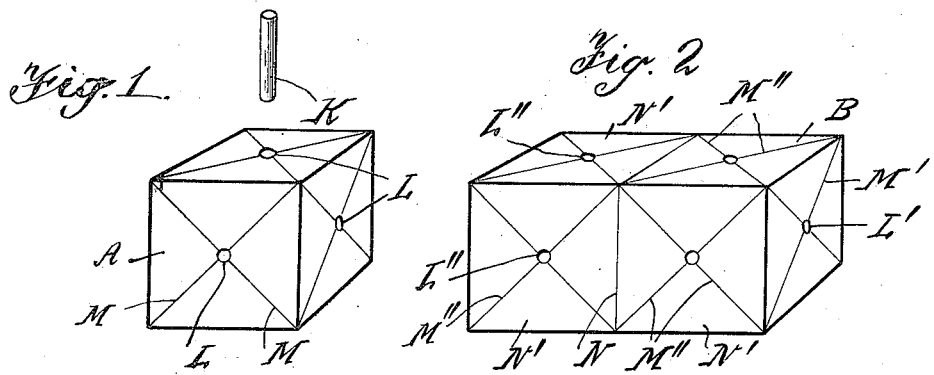
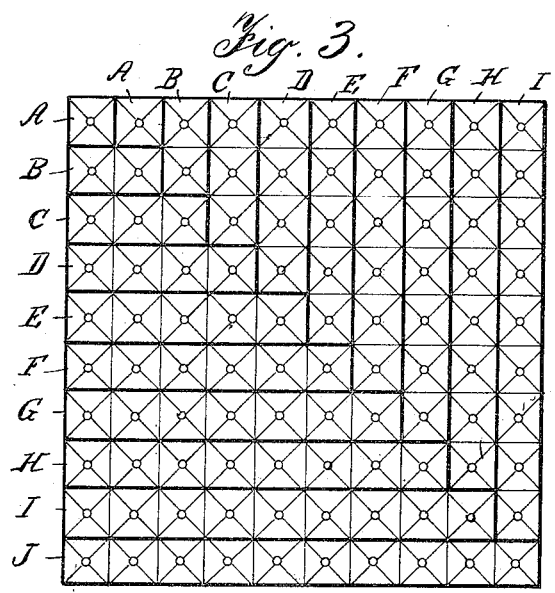
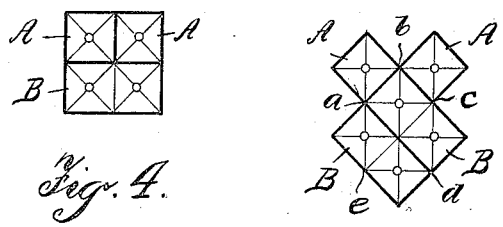
Inventor
John. W. Benton.
By his Attorney
Albert E. Parker Patented Sept. 5, 1922.

1,428,206

UNITED STATES PATENT OFFICE.

JOHN W. BENTON, OF HARLOWE, NEW SOUTH WALES, AUSTRALIA.

EDUCATIONAL DEVICE.

Application filed November 10, 1919. Serial No. 336,959.

*To all whom it may concern:*

Be it known that JOHN WILLIAM BENTON, subject of the King of Great Britain and Ireland, and residing at Harlowe, North Richmond, New South Wales, Australia, has invented certain new and useful Improvements in Educational Devices, of which the following is a specification.

This invention relates to a teaching device in the form of a sectional block structure, the elements of which may be arranged and associated according to various systems or methods for the purpose of facilitating the explanation and solution of problems in numbers, so as to offer to students, especially younger students, a materialized exposition of the elements of propositions submitted to them, the relations of quantities contained in said elements, and the mechanism of the solutions of arithmetical and certain other problems.

The device has its utility in demonstrating the relations of numbers, the building up of totals and subtractions therefrom, subdivision of plural numbers into their elements, the relation of linear, superficial, and cubic measurements, and the operation of the laws of distribution and association of numbers whether integral or fractional.

In carrying out my invention, I provide a set of rectangular blocks varying in length but uniform in sectional dimensions, being preferably square in cross section. The block lengths are in multiple relation, preferably in the ratio of consecutive multiples, that is to say, the smaller block may be say a cube, the next may be twice as long, representing two such units, another three times as long, and so forth. Another feature of my invention consists in means whereby two or more blocks may be detachably connected with each other in aligning position, or one alongside the other, or one above the other. Again, certain further uses of my improved mathematical blocks result from their being provided with lines marking the equal divisions and diagonals, as will be fully explained hereinafter.

Without desiring to restrict myself to the particular embodiment of my invention illustrated by the accompanying drawings, I will now describe this species in detail, and will then point out the novel features of the invention in the appended claims.

In said drawings, Fig. 1 is a perspective view of a cube block embodying my invention; Fig. 2 is a similar view of a rectangular block having a length double that of the cube; Fig. 3 is a plan view of a set of blocks illustrating a decimal scale; Fig. 4 illustrates an example of applying my blocks to the teaching of arithmetic; and Fig. 5 illustrates an example of employing the blocks to teach geometry.

In this particular example of my invention, there are ten different kinds of blocks in a set. Some of these blocks, as A, are cubes, others, as B, are of the same thickness and of the same height as said cubes, but twice as long, still others, C, are three times as long while of the same height and thickness, and so forth, until we reach a block, as J, ten times as long as the cube unit block A but of the same thickness and height. Preferably the number and arrangement of blocks in one set is such that all the blocks may be put together to form a square the side of which equals the length of the longest block, that is to say, the ten-unit block J, in this particular case. For instance, there may be one block J, and one pair of each of the other blocks A, B, C, D, E, F, G, H, and I, as indicated in Fig. 3.

The cube or unit block A is provided at the center of each of its six faces with an opening or socket to receive a pin such as K. The pins fit into these openings L tightly enough to become firmly connected with the block, so that the projecting end of the pin may form a convenient means of enumeration and to demonstrate mathematical operations. The openings L are preferably (for the sake of simplicity in manufacture) through-openings or holes extending from one face of the block to the opposite face, and of course the three holes L, extending in mutually perpendicular directions, will intersect at the center of the cube block A. Each of the six square faces of said block is made with diagonal lines or marks M, the two diagonals of the same face intersecting at the hole or socket L. The other blocks, B, C, D, E, F, G, H, I, and J have two square ends of the same size as the square faces of the cube blocks A, and four equal rectangular sides, the long side of the rectangle being a multiple of its short side, as explained above. The square faces are marked at the diagonals M' and made with central openings or sockets L' in the same manner as the faces of the cube block A; the rectangular faces are marked off in squares by lines N, and these squares N' have diagonal lines or marks M", and at the center of each square N' there is a socket or opening L" of the same character as the sockets L and L'. Thus, while the cube block A has only three through-openings L forming six sockets, one in each of the faces of the block, the longer blocks have two or more sockets in each of their rectangular faces. That is, the two-unit block, B, will have two sockets in each of its rectangular faces, or ten sockets altogether in all its (six) faces; the three-unit block C will have fourteen sockets, and so forth, the ten-unit block J having forty-two sockets.

The blocks may be made of wood or other suitable material, and the pins K also of wood, metal, or other material. While the pins fit tightly into any one of the openings L, L', L", which are alike in diameter, they can be pulled out readily when it is desired to disconnect the blocks or to pack the pins into a separate case or container.

The blocks, when arranged to form a square, as in Fig. 3, are generally packed in a box of corresponding shape, and by superposing two or more layers, a plurality of such sets may be packed in the same box.

Blocks of this improved character may be used in various ways to demonstrate properties of numbers, the solution of arithmetical and other problems, the proving of geometrical theorems, etc. Two examples of such applications are shown in the drawings. Fig. 4 illustrates the forming of the sum $1+1=2$. Two of the cube blocks are placed in alignment and may be connected, if desirable, by one of the pins K. Then one of the two-unit blocks B is placed alongside as shown, offering a clear ocular demonstration of the equality of length, area, and volume. Addition, subtraction, multiplication, division, the formation and properties of series, and other operations may be readily taught with the aid of these blocks, in a manner that will be obvious to teachers of mathematics. In Fig. 5, two blocks B (of the two-unit character) and two cube blocks A have been placed together in such a manner that the blocks B will form a square and the two blocks A extensions adjacent to one corner of said square. With the aid of the diagonal markings on the blocks, it will be easy to show that the sum of the two squares formed by the blocks A is equal to the square $a\,c\,d\,e$ formed by portions of the two blocks B, thus proving the Pythagorean theorem, as regards the triangle $a\,b\,c$.

By means of the pins K the blocks may be connected in longitudinal alignment, or alongside each other, or in superposed arrangement, and structures such as a hollow cube and others may be built up from them to demonstrate problems of solid geometry and of volume.

It will be seen that by making each division of the blocks a definite unit, such as an inch or a centimetre, each block constitutes a measuring device, for example, a six-inch measuring device, or a ten-inch measuring device.

It will not be necessary to describe these various uses of my improved blocks in detail, the suggestions given above sufficing to guide any person familiar with the teaching of mathematics, in the practical use of my invention.

I claim as my invention:

1. A six-faced block for mathematical purposes, of rectangular form, and having intersecting diagonal markings on each square field of each face thereof, and having a pin-receiving socket in each square field of each face of the block, located at the intersection of the diagonal markings of said field.

2. A six-faced block for mathematical purposes, having its opposite end faces of equal square form, and its remaining four faces of equal rectangular form, each of said rectangular faces comprising an exact number of square fields each equal to one of said end faces, each square field of each face of the block having intersecting diagonal markings thereon.

3. A six-faced block for mathematical purposes, having its opposite end faces of equal square form, and its remaining four faces of equal rectangular form, each of said rectangular faces comprising an exact number of square fields each equal to one of said end faces, each square field of each face of the block having intersecting diagonal markings thereon and having a pin receiving socket therein located at the intersection of the diagonal markings of said field.

4. A set of blocks for mathematical purposes, comprising a plurality of six-faced rectangular blocks all of which are equal as to the shape and size of opposite end faces thereof, one of said blocks being of unit length, and the lengths of the remaining blocks increasing in arithmetical progression by said unit length.

5. A set of blocks for mathematical purposes, comprising a plurality of six-faced rectangular blocks, alike in cross-section, and increasing in length in arithmetical progression, each block having a pin-receiving socket in the center of each unit area of each face thereof.

6. A set of blocks for mathematical purposes, comprising a plurality of six-faced rectangular blocks, alike in cross-section, the smallest block being in the form of a cube, and the remaining blocks increasing in length in arithmetical progression by the length of said smallest block, each square unit area of each face of each block having intersecting diagonal markings thereon.

7. A set of blocks for mathematical purposes, comprising a plurality of six-faced rectangular blocks, alike in cross-section, the smallest block being in the form of a cube, and the remaining blocks increasing in length in arithmetical progression by the length of said smallest block, each square unit area of each face of each block having intersecting diagonal markings thereon and having a pin receiving socket therein located at the intersection of the diagonal markings thereon.

8. A set of six-faced rectangular blocks for mathematical purposes, comprising blocks all of which are alike as to the shape and size of two opposite ends, said blocks differing as to length, the lengths of different blocks being consecutive multiples of the length of the smallest block, the maximum total one-face area of all blocks being equal to the square of the length of the longest block.

9. A six-faced block for mathematical purposes, of rectangular form, having a socket in the center of each square field of each face thereof, in combination with separate pins insertible in said sockets to connect any face of said block to a face of a similar block.

In testimony whereof I affix my signature.

JOHN W. BENTON.